United States Patent [19]

Ahne

[11] Patent Number: 4,622,285

[45] Date of Patent: Nov. 11, 1986

[54] METHOD FOR MANUFACTURING POLYOXAZOLE AND POLYTHIAZOLE PRECURSORS

[75] Inventor: Hellmut Ahne, Röttenbach, Fed. Rep. of Germany

[73] Assignee: Siemens Aktiengesellschaft, Munich, Fed. Rep. of Germany

[21] Appl. No.: 716,767

[22] Filed: Mar. 27, 1985

[30] Foreign Application Priority Data

Mar. 29, 1984 [DE] Fed. Rep. of Germany ....... 3411659

[51] Int. Cl.$^4$ .................. C08G 65/40; G03C 5/00
[52] U.S. Cl. ................................... 430/322; 430/9; 430/18; 430/190; 430/192; 430/270; 430/280; 430/281; 430/253; 430/254; 525/430; 528/182; 528/185; 528/337; 528/352; 528/353
[58] Field of Search ............... 528/185, 182, 337, 352, 528/353; 430/190, 192, 270, 322, 9, 18, 253, 254, 280, 281, 296; 204/159.18; 525/430

[56] References Cited

U.S. PATENT DOCUMENTS

| 4,332,883 | 6/1982 | Ahne et al. | 430/322 |
| 4,339,521 | 7/1982 | Ahne et al. | 430/192 |
| 4,398,009 | 8/1983 | Ahne et al. | 525/426 |
| 4,423,202 | 12/1983 | Choe | 528/185 |

Primary Examiner—Lester L. Lee
Attorney, Agent, or Firm—Kenyon & Kenyon

[57] ABSTRACT

Oligomeric and/or polymeric polyoxazole and polythiazole precursors can be prepared with high purity, i.e., especially without chloride, in a simple manner if an aromatic and/or heterocyclic dihydroxy, dialkoxy or diaryloxydiamino compound or a corresponding dithio compound is reacted with a dicarboxylic acid in the presence of a carbodiimide. The precursors prepared in this manner are suitable, for instance, for the manufacture of protection and insulating layers.

7 Claims, No Drawings

METHOD FOR MANUFACTURING POLYOXAZOLE AND POLYTHIAZOLE PRECURSORS

BACKGROUND OF THE INVENTION

The invention relates to a method for manufacturing oligomeric and/or polymeric precursors of polyoxazoles and polythiazoles, as well as the use of these precursors.

Precursors of polyoxazoles and polythiazoles are known (see, for instance: E. Behr, "High-Temperature-Stable Plastics", Carl Hanser Publishers, Munich, 1969, pages 99 to 102). They are made from dihydroxy diamines or dimercapto diamines and dicarboxylic acid derivatives, especially acid chlorides. By annealing (at temperatures between 220° and 500° C. or at approximately 400° C.), these precursors can be converted into polyoxazoles or polythiazoles.

Polyoxazoles and polythiazoles can be used, for instance, in the rastering of input screens for x-ray image amplifiers and particularly in microelectronics, and specifically as etching-resistant protection and insulating layers since they have high thermal stability in air (up to approximately 520° C.) and excellent chemical resistance to acids and bases. However, the requirements as to purity are very high in these applications in order to prevent corrosion phenomena in operation over extended periods of time. The strong cost pressure in the semi-conductor sector further compels the use of inexpensive materials and processes.

From U.S. Pat. No. 4,398,009, a method for manufacturing polyoxazole precursors is known, in which an aromatic and/or heterocyclic dihydroxydiamino compound is reacted with a dicarboxylic acid chloride or ester to form a hydroxyl group-containing polycondensation product and then an olefinically unsaturated monoepoxide is added to this polycondensation product. In this manner, radiation-reactive polyoxazole precursors are obtained, i.e., these compounds can be cross-linked by radiation and thus converted into highly heat-resistant polymers (see in this connection U.S. Pat. No. 4,332,883).

In addition to the foregoing resists (these are so-called negative resists), heat-resistant positive resists with a base of polyoxazole precursors are known. These positive resists have polyoxazole precursors in the form of polycondensation products of dihydroxydiamino compounds and dicarboxylic acid chlorides or esters as well as light-sensitive diazoquinones (U.S. Pat. No. 4,339,521). In the polyoxazole and polythiazole precursors known so far, however, the preparation with high purity poses problems if acid chlorides are used, and is expensive. For, the known synthesis methods are very expensive especially because extensive purification operations are required to obtain a low chloride content. On the other hand, predominantly only low-molecular compounds are produced if esters are used.

It is an object of the invention to develop a method which permits a simple production of oligomeric and/or polymeric polyoxazole and polythiazole precursors of high purity, i.e., of precursors which, in particular, are free of chloride.

SUMMARY OF THE INVENTION

According to the invention, this and other objects are achieved by a method in which an aromatic and/or heterocyclic dihydroxy, dialkoxy or diaryloxydiamino compound or a corresponding dithio compound is reacted with a dicarboxylic acid in the presence of a carbodiimide.

By the method according to the invention, polyoxazole and polythiazole precursors of high purity and especially free of chloride can be produced without the need for additional purification operations. A further advantage of this method is that the reaction solution, after separation of the urea derivative produced as a byproduct, can be used directly and without isolation of the precursors as a solid resin, which represents a substantial economic advantage. Aside from the fact that the method, according to the invention is easy to carry out and the reaction products are produced in a pure state, it is further essential with this method that relatively low temperatures can be used, i.e., temperatures which do not convert the precursors into soluble cyclisation products.

DETAILED DESCRIPTION OF THE INVENTION

The method according to the invention can advantageously be carried further in such a manner that an olefinically unsaturated monoepoxide is added to the polycondensation product of the dihydroxydiamino compound or of the dimercaptodiamino compound i.e., of the dithio compound corresponding to the dihydroxy compound, and the dicarboxylic acid. In this manner, radiation-reactive polyoxazole or polythiazole precursors are obtained which can be used, for instance, as photoresist or also for manufacturing protection and insulation layers.

The reaction between the polycondensation product and the olefinically unsaturated monoepoxide is preferably conducted at room temperature or at temperatures of up to about 100° C. in an organic solvent, optionally in the presence of an amine catalyst.

The precursors produced according to the invention have generally the following structure:

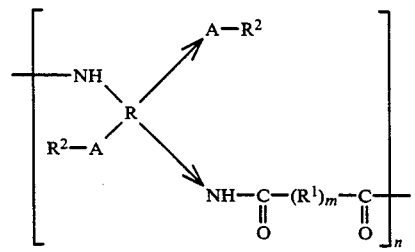

The arrows contained in the formula indicate that the two substituents at R in question can interchange their positions. This is of importance because R is a cyclic radical, as will be explained below.

In the formula, n stands for an integral number from 2 to about 100, and m is 0 or 1.

The following applies to R, $R^1$ and $R^2$: R is an optionally halogenated, at least partially aromatic and/or heterocyclic tetravalent, i.e, tetra-functional radical, in which two respective valences are arranged in mutually adjacent positions; if the radical R has several aromatic and/or heterocyclic structure elements, the valence pairs are respectively located at such structure elements in end positions;

$R^1$ is an optionally halogenated divalent, i.e., difunctional radical of aliphatic and/or cycloaliphatic structure, optionally comprising hetero atoms, and/or of aromatic and/or heterocyclic structure;

R² is hydrogen, an alkyl or aryl radical or an olefinically unsaturated radical, for instance, an allyl ether-containing group, particularly an optionally substituted (meth)acrylic ester-containing group or a propargyl group;

A stands for —O— or —S—.

In particular, the radicals, R, R¹ and R² have the following meaning:

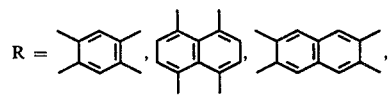

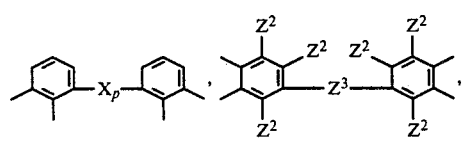

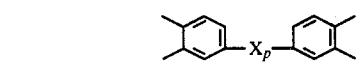

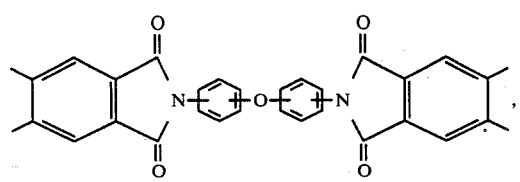

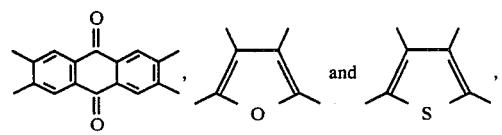

where p=0 or 1 and X stands for one of the following radicals:

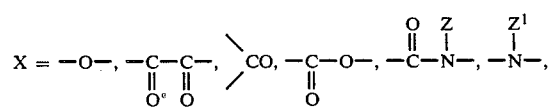

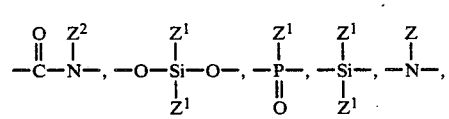

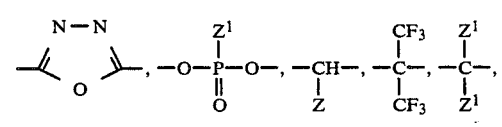

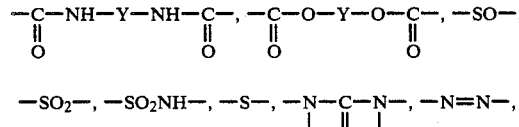

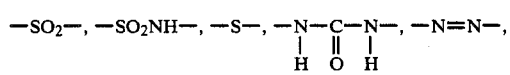

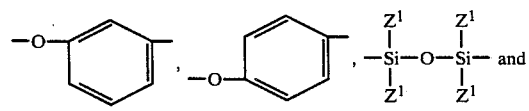

-continued

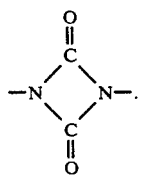

The following applies to the further radicals:

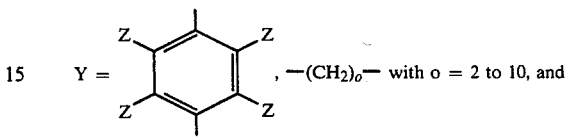

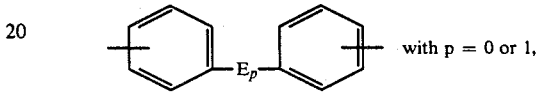

Z=H or alkyl with 1 to 6 carbon atoms,
Z¹=alkyl with 1 to 10 carbon atoms or aryl,
Z²=aryl or heteroaryl and
Z³=

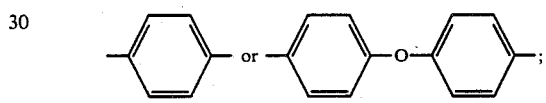

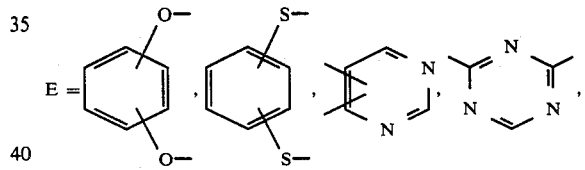

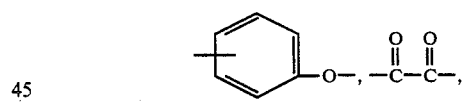

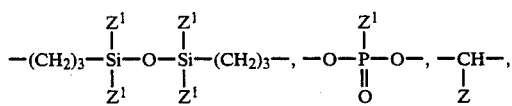

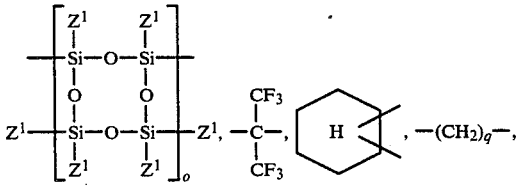

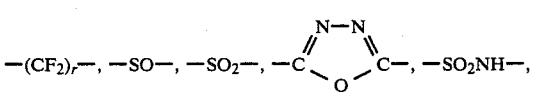

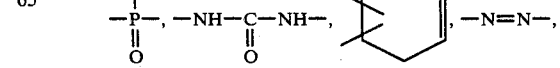

-continued
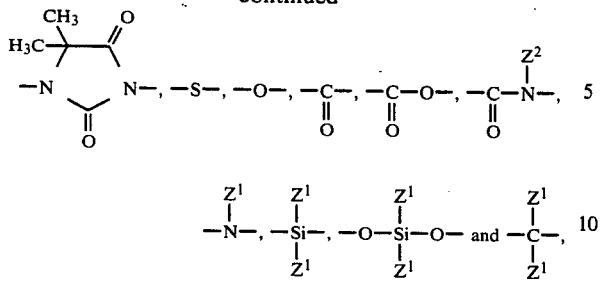
where o=2 to 10, q=2 to 14 and r=2 to 18, and $Z^1$ and $Z^2$ are defined as above.
$R^1 =$ 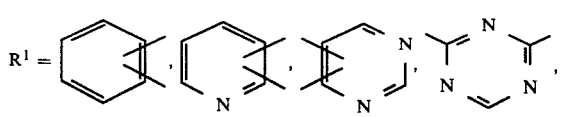
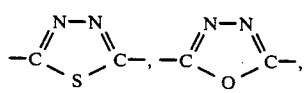
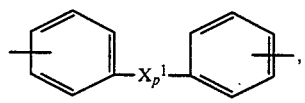
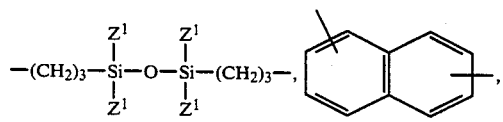
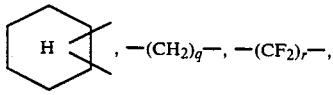
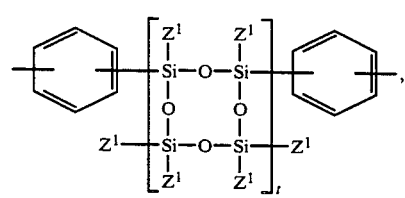
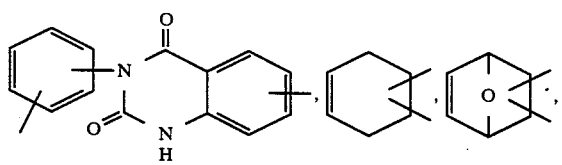
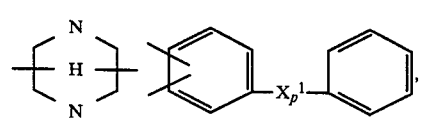
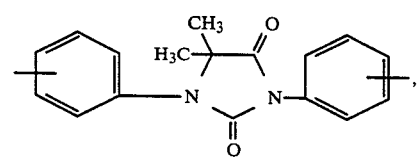
-continued
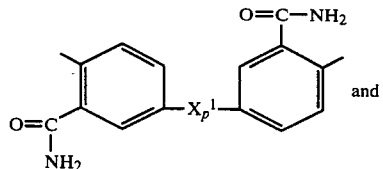 and
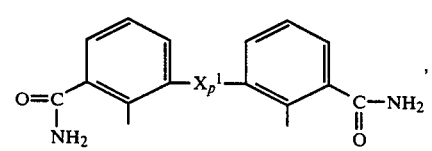,
where p=0 or 1, q=2 to 14, r=2 to 18 and t=1 to 10, and $Z^1$ is defined as above;
$X^1 =$ 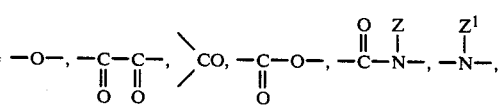
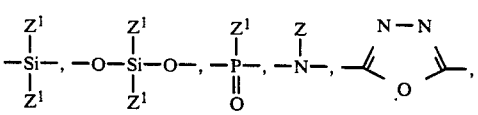
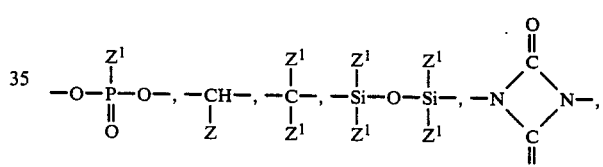
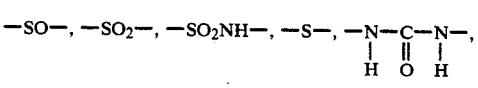
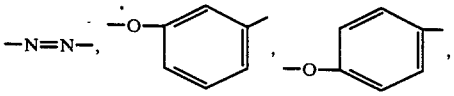
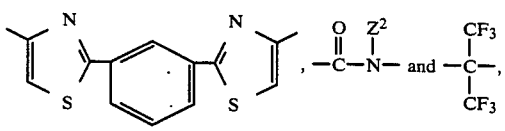
where Z, $Z^1$ and $Z^2$ are defined as above.
$R^2 = -H, -CH_3,$ 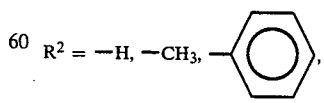,
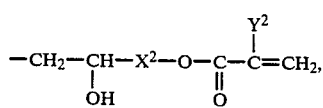

-continued

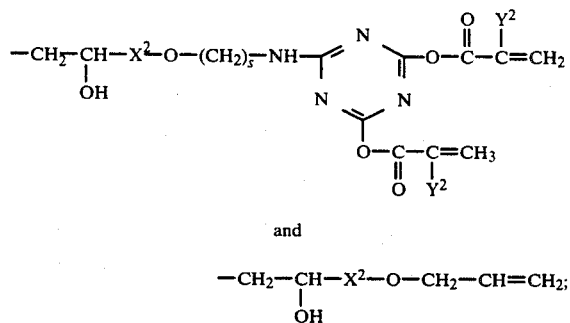

and

—CH$_2$—CH—X$^2$—O—CH$_2$—CH=CH$_2$;
      |
     OH where s=2 to 16; the following applies for the remaining radicals:

X$^2$=—CH$_2$— and
—CH$_2$—O—(CH$_2$)$_r$—O]$_t$(CH$_2$)$_s$—, and

Y$^2$=—H, —CH$_3$, —Cl, —Br, —C≡N, where r=2 to 18, s=2 to 16 and t=0 to 10.

The precursors prepared according to the invention are polycondensation products of dicarboxylic acids with dihydroxy, dialkoxy or diaryloxy diamino compounds (polyoxazole precursors) or with corresponding dithio compounds (polythiazole precursors); different dicarboxylic acids or different diamino compounds can also be used here side by side. The dihydroxy diamino compound preferably used is 3,3'-dihydroxybenzidine; with the corresponding thiols, i.e., the dimercaptodiamino compounds, 3,3'-dimercaptobenzidine is preferred. As dicarboxylic acids are preferably used isophthalic acid and benzophenone dicarboxylic acid. The preferred carbodiimide is dicyclohexylcarbodiimide; carbodiimides are compounds of the type R'—N=C=N—R". Among the optionally used olefinically unsaturated monoepoxides, glycidyl acrylate and methacrylate are preferred.

The precursors prepared according to the invention preferably have aromatic diamino compounds as basic building blocks and therefore yield, in the thermal treatment, polymers with the following structural units:

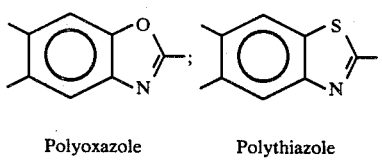

Polyoxazole    Polythiazole

Apart from the use as photoresist and for making protection and insulating layers, wherein structuring takes place, the precursors according to the invention can generally be used, in non-structured form, for making protection and insulating coatings.

The invention will be explained in further detail with the aid of embodiment examples. These examples are not meant to be limiting.

EXAMPLE 1

Preparation of a Polyoxazole Precursor 21.6 parts by weight 3,3'-dihydroxybenzidine (0.1 mole) and 17 parts by weight isophthalic acid (0.12 mole) are dissolved in 80 parts by volume N-methylpyrrolidone. While stirring and cooling down to 8° to 10° C., 21 parts by weight dicyclohexylcarbodiimide (0.1 mole) are then slowly added drop-wise to this solution in 100 volume parts gamma-butyrolactone. A viscous resin solution is formed in the process which is allowed to stand, after the addition is completed, for 3 hours at room temperature; then, the dicyclohexyl urea produced in the reaction is filtered off. The clear resin solution obtained in this manner can be processed by centrifuging on an aluminum sheet and subsequent drying in a circulating-air drying cabinet at a temperature of 70° C. to form a bright transparent film which changes its color only slightly during a 10-hour anneal in air at 400° C.

EXAMPLE 2

Preparation of a Radiation-Reactive Polyoxazole Precursor

To the resin solution prepared in accordance with Example 1, 50 parts by volume glycidyl methacrylate, 0.5 parts by weight benzyldimethylamine and 0.3 parts by weight hydroquinone are added. After heating the reaction solution for 1½ hours to a temperature of 80° to 90° C., the reaction product is precipitated, while stirring, from 1000 parts by volume ethanol. After drying a light-brown powder is obtained.

5 parts by weight of the solid resin obtained in the manner described above, are dissolved in 50 parts by volume N-methylpyrrolidone and the solution is then poured on an aluminum foil to form a film. After drying in a circulating-air oven at a temperature of 70° C., the film is exposed for 5 minutes to a 500-W mercury extra-high pressure lamp. Thereafter, the film is insoluble in N-methylpyrrolidone.

EXAMPLE 3

Preparation of a Polythiazole Precursor

The preparation follows Example 1, 3,3'-dimercaptobenzidine being used instead of 3,3'-dihydroxybenzidine. The properties of the polythiazole precursor so obtained are the same as in the polyoxazole precursor according to Example 1.

What is claimed is:

1. A method for the manufacture of an oligomeric and/or polymeric precursor of a polyoxazole or polythiazole, comprising reacting an aromatic and/or heterocyclic dihydroxy, dialkoxy or diaryloxydiamino compound or a corresponding dithio compound with a dicarboxylic acid in the presence of a carbodiimide.

2. A method for the manufacture of a polyoxazole precursor according to claim 1 wherein 3,3'-dihydroxy or 3,3'-dimethoxybenzidine is reacted with isophthalic acid or benzophenone dicarboxylic acid.

3. A method for the preparation of a polythiazole precursor according to claim 1 wherein 3,3'-dimercaptobenzidine is reacted with isophthalic acid or benzophenone dicarboxylic acid.

4. A method according to claim 1 wherein an olefinically unsaturated monoepoxide is reacted with the polycondensation product of the dihydroxy or dimercaptodiamino compound and the dicarboxylic acid.

5. A method according to claim 4 wherein the reaction between the polycondensation product and the olefinically unsaturated monoepoxide is carried out at a temperature of from about room temperature to a temperature up to about 100° C. in an organic solvent.

6. A method according to claim 5 wherein an amine catalyst is present.

7. A method for the preparation of a protection or insulating layer, which comprises preparing an oligomeric and/or polymeric precursor of a polyoxazole or polythiazole according to claim 1, forming a dried layer of the oligomeric and/or polymeric precursor and annealing the dried layer to produce the protection or insulating layer.

* * * * *